United States Patent [19]

Silverberg

[11] 4,365,889

[45] Dec. 28, 1982

[54] DOCUMENT HANDLING UNIT

[75] Inventor: Morton Silverberg, Rochester, N.Y.

[73] Assignee: Xerox Corporation, Stamford, Conn.

[21] Appl. No.: 205,473

[22] Filed: Nov. 10, 1980

[51] Int. Cl.³ .......................... G03G 15/04; B65H 1/30
[52] U.S. Cl. ............................... 355/14 SH; 271/3.1;
      271/65; 271/276; 271/DIG. 9; 355/76
[58] Field of Search ................ 271/3.1, DIG. 9, 4.3,
      271/65, 276, 195, 197, 275, 233; 355/3 SH, 14
      SH, 23, 76

[56] References Cited

U.S. PATENT DOCUMENTS

| | | | |
|---|---|---|---|
| 3,552,739 | 1/1971 | Roberts et al. | 271/4 |
| 3,944,209 | 3/1976 | Fallos | 271/4 |
| 4,043,665 | 8/1977 | Caldwell | 271/276 X |
| 4,062,538 | 12/1977 | Stange et al. | 271/195 X |
| 4,166,614 | 9/1979 | Hamlin et al. | 271/3.1 |
| 4,234,180 | 11/1980 | Looney | 271/3.1 |
| 4,238,126 | 12/1980 | Langdon | 271/3.1 |

Primary Examiner—Bruce H. Stoner, Jr.
Attorney, Agent, or Firm—H. Fleischer; H. M. Brownrout

[57] ABSTRACT

An apparatus in which documents are moved in a recirculating path from a stack to an imaging station. Successive bottommost documents are fed from the stack to the imaging station with one side of the document being facedown for imaging. The document is transported from the imaging station simultaneously with the next successive document being fed thereto. After leaving the imaging station, the document returns to the top of the stack along one of two paths. One path returns the document to the top of the stack with the image side facedown. The other path returns the document to the top of the stack with the image side face up.

10 Claims, 4 Drawing Figures

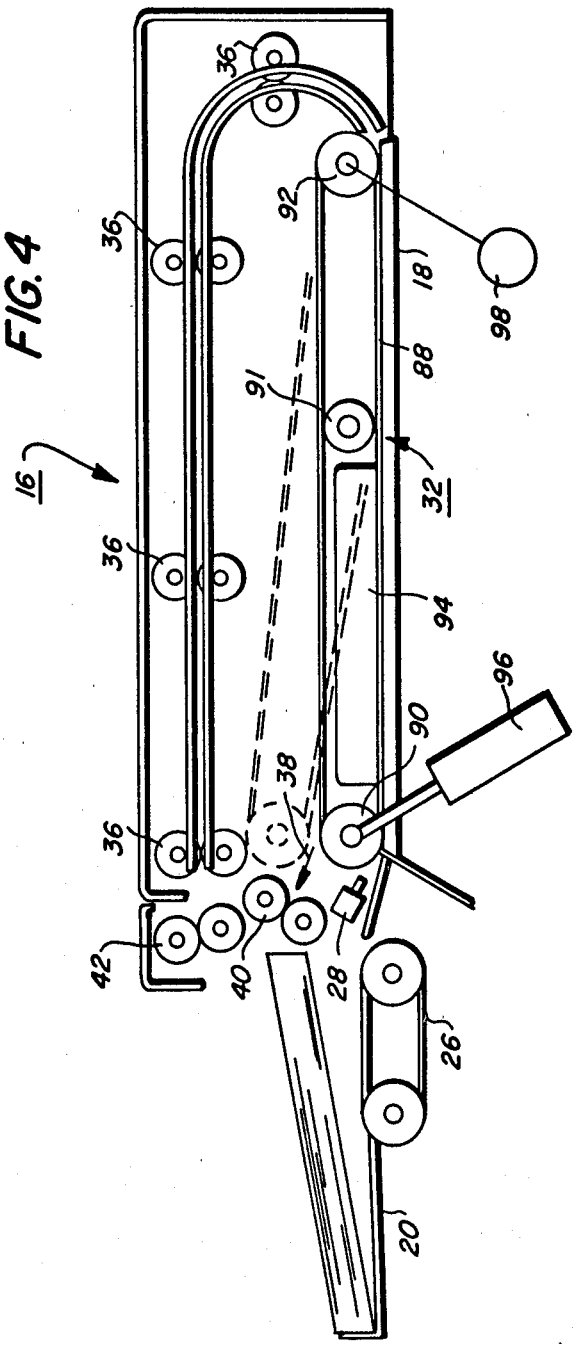

DOCUMENT HANDLING UNIT

This invention relates generally to an apparatus for moving documents in a recirculating path. An apparatus of this type is frequently employed in an electrophotographic printing machine.

As electrophotographic printing machines become increasingly rapid, automatic handling of original documents becomes highly desirable. Today, electrophotographic printing machines have the capability of both duplex and simplex coping, i.e. indicia on both sides or one side of the copy sheet or document. This increases the complexity of the document handling system which must be capable of handling both simplex and duplex original documents. The reproduction of both sides of a duplex original document may be onto separate copy sheets or onto both sides of the same copy sheet. The document handling system should be capable of recirculating either simplex or duplex documents. Generally, the document handling system provides pre-collation copying. In this way, the copies exit the printing machine in a pre-collated set, and do not require subsequent sorting. Any desired number of such copy sets may be made by making a corresponding number of recirculations of the original documents.

Hereinbefore, the stack of original documents were generally disposed over the imaging station. It is highly advantageous to position the stack of original documents along side of the imaging station. In duplex copying, the original document must be recirculated and inverted, while simplex copying merely requires recirculation of the original document. The document handling unit must be capable of satisfying all of the foregoing requirements. Various approaches have been devised to improve document handling systems. The following disclosures appear to be relevant:

U.S. Pat. No. 3,552,739; Patentee: Roberts et al.; Issued: Jan. 5, 1971.

U.S. Pat. No. 3,944,209; Patentee: Fallos; Issued: Mar. 16, 1976.

U.S. Pat. No. 4,043,665; Patentee: Caldwell; Issued: Aug. 23, 1977.

U.S. Pat. No. 4,234,180; Patentee: Looney; Issued: Nov. 18, 1980.

The pertinent portions of the foregoing disclosures may be briefly summarized as follows:

Roberts et al. discloses a document handling apparatus in which successive bottommost sheets of a stack of documents are sequentially fed past an exposure slot and then returned to the top of the stack in their original position and orientation. The feeding of the sheets in this recirculating manner permits the creating of a pre-collated output copy set.

Fallos describes a document handler in which the tracking belt drive assembly is pivotable upwards about a pivot pin located adjacent the feed roller shaft to provide ready access to the tracking plate area.

Caldwell describes a document handler for automatically feeding documents onto and ejecting documents from an exposure platen. The document handler includes a vacuum belt system which is pivotable to eject documents from the platen. In this way, the lead edge of the ejected document passes over a document registration edge guide.

Looney discloses a document handling unit in which documents are fed from the bottom of a stack onto an imaging station. The documents may be returned to the top of the stack for recirculation without inversion or advanced into an inverting chute. For duplex documents, the document is returned to the top of the stack from the inverting chute to copy the other side thereof.

In accordance with the present invention, there is provided an apparatus for moving a document in a recirculating path from a stack to an imaging station. Means are provided for feeding successive bottommost documents from the stack to the imaging station with one side of the document being facedown at the imaging station. Means, movable from a position in communication with the imaging station to a position remote therefrom, transport the document from the imaging station simultaneously with the feeding means feeding the next successive document thereto. Means advance the document from the transporting means to the top of the stack. The advancing means comprises at least two paths. One of the paths positions the document on top of the stack with the one side facedown. The other of the paths positions the document on top of the stack with the one side face up.

Other features of the present invention will become apparant as the following description proceeds and upon reference to the drawings, in which:

FIG. 4 shows the document handling unit used in the FIG. 1 printing machine for FIG. 2 simplex copying and FIG. 3 duplex copying.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
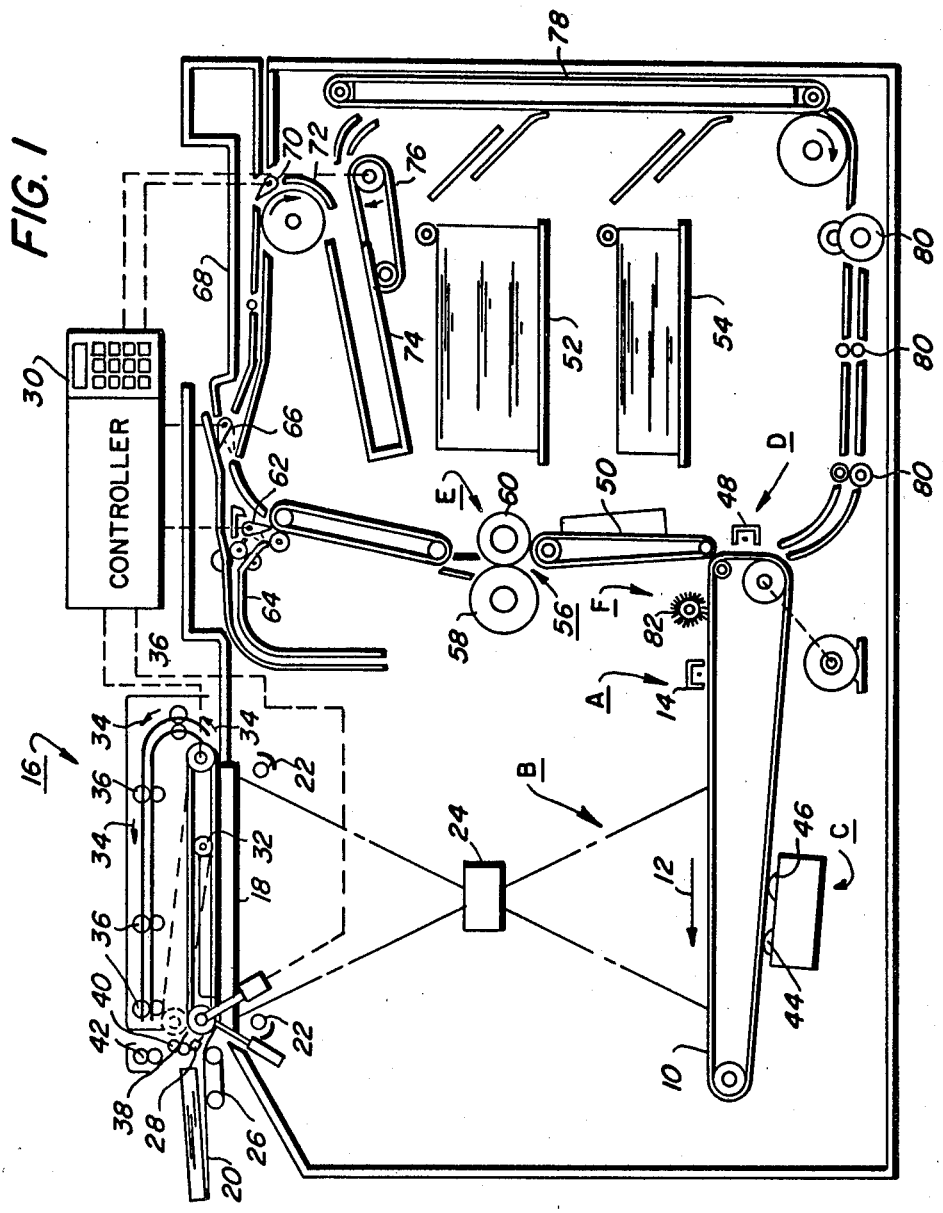
FIG. 1 is a schematic elevational view illustrating an electrophotographic printing machine incorporating the features of the present invention therein.

For a general understanding of the features of the present invention, reference is had to the drawings. In the drawings, like reference numerals have been used throughout to designate identical elements. FIG. 1 schematically depicts the various components of an illustrative electrophotographic printing machine incorporating the document handling unit of the present invention therein. It will become evident from the following discussion that the document handling unit is equally well suited for use in a wide variety of printing machines, and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the illustrative electrophotographic printing machine employs a belt 10 having a photoconductive surface thereon. Preferably, the photoconductive surface comprises a transport layer containing a small molecule dispersed in an organic resinous material and a generation layer having trigonal selenium dispersed in a resinous material. Belt 10 moves in the direction of arrow 12 to advance successive portions of the photoconductive surface through the various processing stations disposed about the path of movement thereof.

Initially, a portion of the photoconductive surface passes through charging station A. At charging station A, a corona generating device, indicted generally by the reference numeral 14, charges the photoconductive surface to a relatively high substantially uniform potential.

Next, the charged portion of the photoconductive surface is advanced through imaging station B. At imaging station B, a document handling unit, indicated generally by the reference numeral 16, is position over platen 18 of the printing machine. Document handling unit 16 sequentially feeds documents from a stack of documents placed by the operator facedown in a normal forward collated order in document stacking and holding tray 20. The documents are fed from the bottom of the stack, in seriatim, to platen 18. Lamps 22 illuminate the document positioned on transparent platen 18. The light rays reflected from the document are transmitted through lens 24. Lens 24 focuses the light image of the original document onto the charged portion of the photoconductive surface of belt 10 to selectively dissipate the charge thereof. This records an electrostatic latent image on the photoconductive surface which corresponds to the informational areas contained within the original document. Thereafter, belt 10 advances the electrostatic latent image recorded on the photoconductive surface to development station C.

Document handling unit 16 recirculates the documents back to the top of the stack of documents supported on tray 20. The document handling unit has switches or other sensors for detecting and counting the individual documents fed from tray 20. A resettable bale indicates through its associate switch the completion of each circulation of the complete document set. The switch is automatically reset on top of the stack before the next circulation. Document handling unit 20 is adapted to serially sequentially feed the documents, which may be of various sizes and weights of paper or plastic containing information to be copied on one or both sides thereof. A bottom feeder 26 feeds the bottommost document sheet from the stack on tray 20. Bottom feeder 26 feeds the bottommost document, on demand by controller 30, from the stack onto platen 18. The side facing platen 18, i.e. the side face down, is imaged to form the electrostatic latent image thereof on the photoconductive surface of belt 10. After imaging, vacuum belt system 32 pivots about an intermediate point in an upwardly direction to space the document from platen 18 as the next successive original document is being advanced thereto by bottom feeder 26. Simultaneously therewith, nozzle 28 directs a flow of pressurized air between the exiting and entering documents to facilitate separation therebetween. Controller 30 energizes the drive motor of vacuum belt system 32 so as to advance the original document adhering thereto along one of two paths. One of these paths inverts the original document while the other path does not invert the original document. Thus, each document is selectively inverted or not inverted as it is returned by vacuum belt system 32 to the top of the stack of documents on tray 20. If the document is to be inverted, vacuum belt system 32 advances the document in the direction of arrows 34 through forwarding rollers 36 and 42 back to the top of the stack of documents on tray 20. However, if the document is not to be inverted, vacuum belt system 32 moves the document in the direction of arrow 38 through rollers 40 back to the top of the stack of documents on tray 20.

With continued reference to FIG. 1, the exemplary electrophotographic printing mchine will be described in further detail. At development station C, a pair of magnetic brush developer rollers, indicated generally by the reference numerals 44 and 46, advance a developer material into contact with the electrostatic latent image. The latent image attracts toner particles from the carrier granules of the developer material to form a toner powder image on the photoconductive surface of belt 10.

Belt 10 then advances the toner powder image to transfer station D. At transfer station D, a sheet of support material is moved into contact with the toner powder image. Transfer station D includes a corona generating device 48 which sprays ions onto the backside of the sheet of support material. This attracts the toner powder image from the photoconductive surface of belt 10 to the sheet. After transfer, conveyor 50 advances the sheet to fusing station E.

The sheets of support material are fed from a selected one of the trays 52 or 54 to transfer station D. After transfer of the toner powder image to the first side of the sheet of support material, the sheets are then advanced by vacuum conveyor 50 to fusing station E.

Fusing station E includes a fuser assembly, indicated generally by the reference numeral 56, which permanently affixes the transferred powder image to the sheet of support material. Preferably, fuser assembly 56 includes a heated fuser roller 58 and a backup roller 60. The sheet passes between fuser roller 58 and backup roller 60 with the powder image contacting fuser roller 58. In this manner, the powder image is permanently affixed to the sheet. After fusing, the sheets are fed to gate 62 which functions as an inverter selector. Depending upon the position of gate 62, the sheets of support material will either be deflected into a sheet inverter 64 or bypass inverter 64 and be fed directly onto a second decision gate 66. Those sheets which bypass inverter 64 turn a 90° corner in the sheet path before reaching gate 66. Gate 66 inverts the sheets into a face up orientation, so that the imaged side which has just been transferred and fused is face up. If inverter path 64 is selected, the opposite is true, i.e. the last printed face is face down. The second decision gate 66 either deflects the sheet directly into an output tray 68 or deflects the sheets into a transport path which carries them on without inversion to a third decision gate 70. Gate 70 either passes the sheets directly on without inversion into the output path of the copier, or deflects the sheets into a duplex inverter roller transport 72. Inverting transport 72 inverts and stacks sheets to be duplexed in a duplex tray 74 when gate 70 so directs. Duplex tray 74 provides intermediate or buffer storage for those sheets which have been printed on one side and on which an image will be subsequently printed on the side opposed thereto, i.e. the sheets being duplexed. Due to the sheet inverting by rollers 72, these buffer set sheets are stacked in duplex tray 74 facedown. They are stacked in duplex tray 74 on top of one another in the order in which they are copied.

In order to complete duplex copying, the previously simplexed sheets in tray 74 are fed seriatim by bottom feeder 76 from tray 74 back to transfer station D for transfer of the toner powder image to the opposed side of the sheet. Conveyors 78 and rollers 80 advance the sheet along a path which produces an inversion thereof.

However, inasmuch as the bottommost sheet is fed from duplex tray 74, the proper or clean side of the copy sheet is positioned in contact with belt 10 at transfer station D so that the toner powder image thereon is transferred thereto. The duplex sheets are then fed through the same path as the previously simplexed sheets to be stacked in tray 68 for subsequent removal by the printing machine operator.

Returning now to the operation of the printing machine, invariably after the sheet of support material is separated from the photoconductive surface of belt 10, some residual particles remain adhering thereto. These residual particles are removed from the photoconductive surface at cleaning station F. Cleaning station F includes a rotatably mounted fibrous brush 82 in contact with the photoconductive surface of belt 10. The particles are cleaned from the photoconductive surface of belt 10 by the rotation of brush 82 in contact therewith. Subsequent to cleaning, a discharge lamp (not shown) floods the photoconductive surface with light to dissipate any residual electrostatic charge remaining thereon prior to the charging thereof for the next successive imaging cycle.

Controller 30 is preferably a known programmable microprocessor which controls all of the machine functions described hereinbefore including the operation of the document handling unit, the document and copy sheet gates, the feeder drives, etc.. The controller also provides for storage and comparison of counts of the copy sheets, the number of documents being recirculated in the document set, the number of copy sets selected by the operator through the switches thereon, time delays, jam correction control, etc.. The control of all of the exemplary sheet handling systems disclosed hereinbefore may be accomplished by conventionally activating them by signals from the controller in response to simple program commands and control switch inputs from the printing machine console selected by the operator, such as selecting the number of copies, simplex or duplex copying, whether the documents are simplex or duplex, etc. These signals actuate known electrical or solenoid or cam controlled sheet deflector fingers, or drive motors or their clutches in the selected steps or sequences. Conventional sheet path sensors or switches may be utilized for counting and keeping track of the positions of the documents and copy sheets. Pre-collation copying systems heretofore utilized employed microprocessor control circuitry and connecting switches for counting the number of document sheets as they are recirculated as well as counting the number of completed document sets and controlling the operation of the document handling unit, copy sheet feeders, and inverters, etc. Exemplary control systems for both document and sheet handling are described in U.S. Pat. No. 4,062,061, issued Dec. 6, 1977 to Batchelor et al.; U.S. Pat. No. 4,123,155, issued Oct. 31, 1978 to Hubert; U.S. Pat. No. 4,125,325, issued Nov. 14, 1978 to Batchelor et al.; and U.S. Pat. No. 4,144,550, issued Mar. 13, 1979, to Donohue et al. The relevant portions of the foregoing patents are hereby incorporated into the present application where appropriate.

It is believed that the foregoing description is sufficient for purposes of the present application to illustrate the general operation of an electrophotographic printing machine incorporating the features of the present invention therein.

Figure 2:
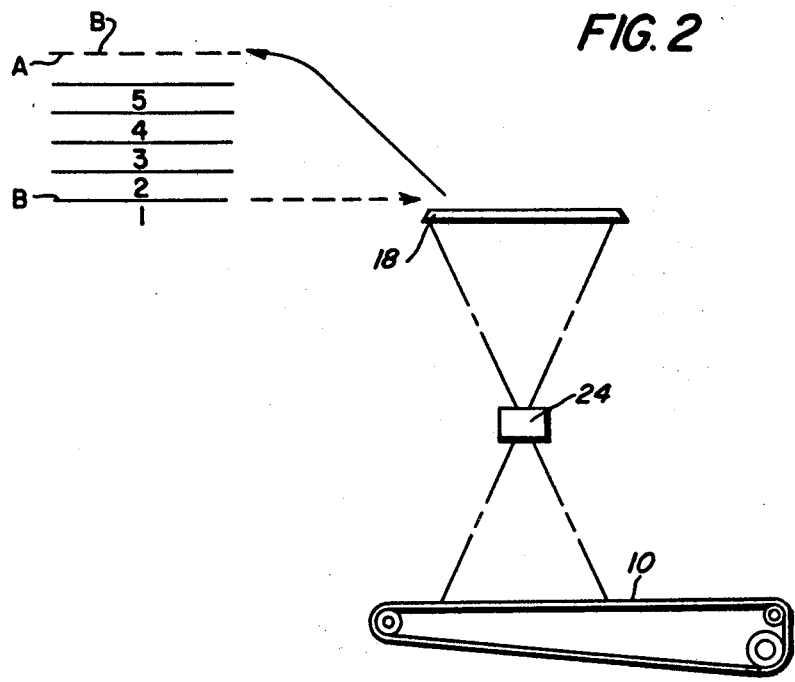
FIG. 2 is a schematic document path for simplex copying.
Figure 3:
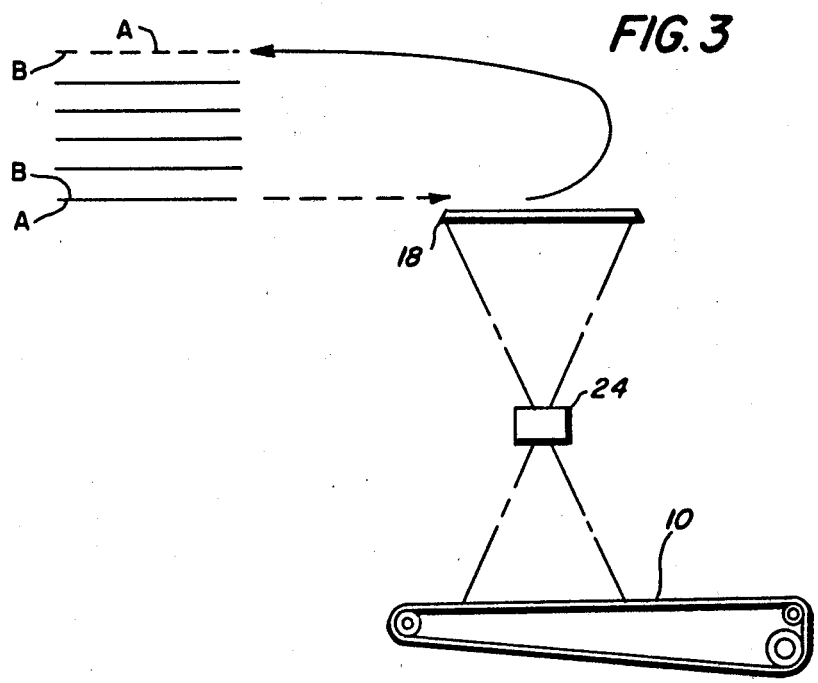
FIG. 3 is a schematic document path for duplex copying.

Referring now to the specific subject matter of the present invention, the general operation of document handling unit 16 will be described hereinafter with reference to FIGS. 2 and 3. FIG. 2 depicts the path of the original document during a non-inverting recirculation. FIG. 3 depicts the path of the original document during an inverting recirculation.

As shown in FIG. 2, original document 1 advances onto platen 18 with side A facedown, i.e. in contact with platen 18, and side B face up. After imaging, original document 1 advances in the direction of arrow 84 onto the top of the stack of five documents with side A facedown, i.e. in contact with the uppermost or fifth document and side B face up. In this mode of operation, successive original documents are fed from the bottom of the stack onto the platen, imaged and returned to the top of the stack with the same side remaining facedown. Thus, the document unit does not invert the original document but returns it to the top of the stack in the same orientation as it was initially.

Turning now to FIG. 3, there is shown once again a stack of five documents with the bottommost document 1 having side A facedown and side B face up. Document 1 advances onto platen 18. After imaging side A, it moves along path 86 back to the top of the stack. When document 1 returns to the top of the stack, side A is face up and side B facedown, i.e. in contact with the last or fifth document of the stack. In this way, the document is inverted so that both sides A and B are imaged. Thus, the document has advanced in a recirculating path and inverted.

Turning now to FIG. 4, there is shown the detailed structure of document handling unit 16. Initially, the operation of document handling unit 16 will be described in the non-inverting mode of operation, i.e. as depicted in FIG. 2. A portion of vacuum belt system 32 pivots about roller 91 in an upwardly direction so as to be remotely located from platen 18, as shown by the dotted lines of FIG. 4. When in this remote position, bottom feeder 26 advances the bottommost original document from the stack on support tray 20. The bottommost document is guided onto transparent platen 18. After receiving the original document, the pivoted portion of vacuum belt system 32 pivots in a downwardly direction so as to position the trailing portion of the original document disposed on platen 18. Vacuum belt system 32 includes a plurality of belts 88 entrained about a pair of spaced rollers 90, 91 and 92. A vacuum system 94 is disposed interiorly of belts 88 with the plenum thereof being in contact with the backside of the belts 88. Preferably, belts 88 are made from a white reflective surface having a plurality of apertures therein coupled to the apertures in the plenum of the vacuum system 94. In this way, the original document is retained releasably on belts 88. After imaging, controller 30 energizes solenoid 96. Energization of solenoid 96 pivots a portion of vacuum belt system 32 about roller to a position remote from transparent platen 18, as shown by the dotted lines of FIG. 4. Motor 98 rotates drive roller 92 in a counterclockwise direction so as to advance the original document being retained on belts 88 in the path indicated by the arrow 38. Simultaneously therewith, feeder 20 advances the next original document onto platen 18. At this time, controller 30 energizes air nozzle 38 to direct a flow of pressurized air between the entering and exiting documents to insure separation of the documents. The imaged document passes between forwarding rollers 40 which return it to the top of the stack on tray 20 with the imaged side facedown.

In the inverting mode of operation, the bottommost sheet is advanced by bottommost feeder 26 away from the remainder of the stack of documents. Nozzle 28 directs the flow of pressurized air onto the lead marginal portion of the entering document to facilitate the separation from the exiting document on tray 20. The new original document is advanced onto transparent platen 18 simultaneously with the exiting of the previous original document therefrom. Controller 30 energizes motor 98 to advance the next successive original document onto platen 18 simultaneously with the exiting of the previous original document therefrom. Motor 98 rotates drive roller 92 in a clockwise direction so as to return the original document to the top of the stack on tray 20 along an inverting path as indicated by arrow 34. Feed rollers 36 and 42 move the sheet along the inverting path onto the top of the stack. In this way, the original document is inverted so that the imaged surface is now face up when the document is disposed on top of the stack of documents on tray 20.

It is clear that the document handling unit depicted in FIG. 4 has the stack of original documents disposed to one side of the document feeding system. The document feeding system is positioned over the platen of the printing machine. Generally, the design heretofore adopted by most commercial electrophotographic printing machines required an over the platen system wherein the stack of original documents and the document feeding system are disposed over the platen. This significantly increases the weight and height of the document handling unit. In the improved document handling unit of the present invention the document feeder can be integral with the printing machine. Only the belt transports need be movable to provide access to the platen. Thus, the document handling unit of the present invention is significantly simpler and more economically constructed then those heretofore utilized.

In recapitulation, it is clear that the improved document handling unit of the present invention automatically recirculates documents in an inverting or non-inverting mode to and from a stack thereof. This permits the formation of pre-collated copy sets without the requirement of a sorting apparatus. The system is lighter than those generally in commercial use since the stack of original documents is disposed along side the platen rather than being over the platen. Furthermore, the document exchange time is greatly reduced, inasmuch as the entering document is advanced onto the platen simultaneously with the exiting document being transported therefrom.

It is, therefore, evident that there has been provided in accordance with the present invention an apparatus for recirculating original documents which fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications, and variations as fall within the spirit and broad scope of the appended claims.

What is claimed is:

1. An apparatus for moving documents in a recirculating path from a stack to an imaging station, including:

means for feeding successive bottommost documents from the stack to the imaging station with one side of the document being facedown at the imaging station;

means above the imaging station for transporting an exiting document from the imaging station simultaneously with said feeding means feeding a next successive entering document thereto;

means for pivoting said transporting means to space at least a portion of both said transporting means and the exiting document from the imaging station;

means for advancing the exiting document from said transporting means to the top of the stack, said advancing means comprising at least two paths one of the paths positioning the exiting document on top of the stack with said one side facedown and the other of the paths positioning the exiting document on top of the stack with said one side face up; and means for controlling said transporting means for transporting the exiting document along a selected one of the paths of said advancing means, said controlling means comprising means for driving said transporting means in a first direction to advance the document along one of the paths of said advancing means and in a second direction, opposed to the first direction, to advance the document along the other of the paths of said advancing means.

2. An apparatus according to claim 1, further including means for directing a flow of air between the entering document and the exiting document to facilitate separation therebetween.

3. An apparatus according to claim 2, wherein said transporting means includes vacuum belt means arranged to retain the document fed to the imaging station thereon, said vacuum belt means being pivotable about an axis intermediate opposed ends thereof.

4. An apparatus for moving documents in a recirculating path from a stack to an imaging station, including:

means for feeding successive bottommost documents from the stack to the imaging station with one side of the document being facedown at the imaging station;

means, movable from a position in communication with the imaging station to a position remote therefrom, for transporting the exiting document from the imaging station simultaneously with said feeding means feeding the next successive entering document thereto, said transporting means includes vacuum belt means arranged to retain the document fed to the imaging station thereon, and means for pivoting said vacuum belt means to space at least a portion of the document retained thereon from the imaging station;

means for directing a flow of air between the entering document and the exiting document to facilitate separation therebetween;

means for advancing the exiting document from said transporting means to the top of the stack, said advancing means comprising at least two paths one of the paths positioning the exiting document on top of the stack with said one side facedown and the other of the paths positioning the exiting document on top of the stack with said one side face up; and means for controlling said transporting means for transporting the exiting document along a selected one of the paths of said advancing means, said controlling means includes means for driving said vacuum belt in a first direction to advance the document along one of the paths of said advancing means and in a second direction, opposed to the first direction, to advance the document along the other of the paths of said advancing means.

5. An apparatus according to claim 4, further including means for supporting the stack of documents at one side of the imaging station.

6. A reproducing machine of the type having a platen for supporting a document in communication with an optical system for imaging the document through the platen, wherein the improvement includes:
   means for feeding successive bottommost documents from a stack to the platen with one side of the document being facedown on the platen;
   means above the platen for transporting an exiting document from the platen simultaneously with said feeding means feeding a next successive entering document thereto;
   means for pivoting said transporting means to space at least a portion of both said transporting means and the exiting document from the platen;
   means for advancing the exiting document from said transporting means to the top of the stack, said advancing means comprising at least two paths one of the paths positioning the exiting document on top of the stack with said one side facedown and the other of the paths positioning the exiting document on top of the stack with said one side face up; and
   means for controlling said transporting means for transporting the exiting document along a selected one of the paths of said advancing means, said controlling means comprising means for driving said transporting means in a first direction to advance the document along one of the paths of said advancing means and in a second direction, opposed to the first direction, to advance the document along the other of the paths of said advancing means.

7. A reproducing machine according to claim 6, further including means for directing a flow of air between the exiting document and entering document to facilitate separation therebetween.

8. A reproducing machine according to claim 7, wherein said transporting means includes vacuum belt means arranged to retain the document fed to the platen thereon,
   said vacuum belt means being pivotable about an axis intermediate opposed end thereof.

9. A reproducing machine of the type having a platen for supporting a document in communication with an optical system for imaging the document through the platen, wherein the improvement includes:
   means for feeding successive bottommost documents from a stack to the platen with one side of the document being facedown on the platen;
   means, movable from a position in communication with the platen to a position remote therefrom, for transporting the exiting document from the platen simultaneously with said feeding means feeding the next successive entering document thereto, said transporting means includes vacuum belt means arranged to retain the document fed to the platen thereon, and means for pivoting said vacuum belt means to space at least a portion of the document retained thereon from the platen;
   means for directing a flow of air between the exiting document and entering document to facilitate separation therebetween;
   means for advancing the exiting document from said transporting means to the top of the stack, said advancing means comprising at least two paths one of the paths positioning the exiting document on top of the stack with said one side facedown and the other of the paths positioning the exiting document on top of the stack with said one side face up; and
   means for controlling said transporting means for transporting the exiting document along a selected one of the paths of said advancing means, said controlling means includes means for driving said vacuum belt means in a first direction to advance the document along one of the paths of said advancing means and in a second direction, opposed to the first direction, to advance the document along the other of the paths of said advancing means.

10. A reproducing machine according to claim 9, further including means for supporting the stack of documents at one side of the platen.

* * * * *